INVENTOR
STIG GUSTAF WILHELM LINDQUIST
BY Hane and Baxley
ATTORNEYS

INVENTOR
Stig Gustaf Wilhelm Lindquist
BY Hane and Baxley
ATTORNEYS

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| $D_1$ | -1 | -1 | -1 | -1 | -1 | -1 | -1 | -1 | -1 | 0 | 0 | 0 | 0 | 0 | 0 | 0 | 0 | 0 | 1 | 1 | 1 | 1 | 1 | 1 | 1 | 1 | 1 |
| $D_2$ | 1 | 1 | 1 | 0 | 0 | 0 | -1 | -1 | -1 | -1 | -1 | -1 | 0 | 0 | 0 | 1 | 1 | 1 | 1 | 1 | 1 | 0 | 0 | 0 | -1 | -1 | -1 |
| $D_3$ | -1 | 0 | 1 | 1 | 0 | -1 | -1 | 0 | 1 | 1 | 0 | -1 | -1 | 0 | 1 | 1 | 0 | -1 | -1 | 0 | 1 | 1 | 0 | -1 | -1 | 0 | 1 |

INVENTOR
STIG GUSTAF WILHELM LINDQUIST
BY Hane and Baxley
ATTORNEYS

INVENTOR
Stig Gustaf Wilhelm Lindquist
BY Hane and Baxley
ATTORNEYS

United States Patent Office 3,566,389

Patented Feb. 23, 1971

3,566,389

CIRCUIT ARRANGEMENT FOR GENERATING A V-SHAPED TRANSFER CHARACTERISTIC

Stig Gustaf Wilhelm Lindquist, Hagersten, Sweden, assignor to Telefonaktiebolaget L M Ericsson, Stockholm, Sweden, a corporation of Sweden

Filed Dec. 21, 1967, Ser. No. 692,576
Claims priority, application Sweden, Jan. 26, 1967, 1,146/67
Int. Cl. H03k *13/17*
U.S. Cl. 340—347 1 Claim

ABSTRACT OF THE DISCLOSURE

An analog-to-digital encoder encodes analog signals to trinary codes. The encoder comprises a cascaded chain of stages having three-level discriminators extending from each stage. Each stage includes a first amplifier with a limited amplitude transfer characteristic. The output of the first amplifier and the input to the stage are analog added and then reamplified to provide analog signals for the associated discriminators and the following stages.

This invention pertains to circuits for generating a V-shaped transfer characteristic and more particularly to such a circuit which may be used as a stage in an analog-to-digital converter of the "stage-by-stage" encoder type.

In order to produce the analog-to-digital conversion of a signal a so-called stage-by-stage encoder can be used. The principle of such an encoder is described for example in IRE Transactions on Instrumentation, June 1956: "An unusual electronic analog-digital conversion method." According to the article the analog signal is fed through a number of identical series-connected stages having a certain transfer characteristic which is dependent on the digital code to be used. Between each stage there is provided a discriminator which, for example, during the binary coding transmits one of two definite direct voltages, depending on whether the input signal exceeds a certain value or not. With this type of encoders a continuous coding is obtained, without any restoring and synchronizing operations. The required stage transfer characteristic will however be of the non-linear type (a straight binary code requiring the characteristic to have the shape of a "sawtooth," a Gray-code requiring the shape to be a V). Such characteristics are difficult to generate in a simple way. According to the article as well as according to the U.S. Pat. 3,187,325 different types of operational amplifiers are used in the stages. However such amplifiers require a large number of components and are difficult to stabilize because of the great feedback.

The present invention relates to an arrangement which, without the above-mentioned inconveniences, generates a V-shaped transfer characteristic. The invention contemplates an arrangement which comprises a first amplifier having an input which constitutes the input of the stage. The amplifier has, within a certain part of the amplitude range of the analog signal, a constant negative amplification and outside this part delivers a constant output signal. An adding circuit adds the output signal of the amplifier and the input signal of the circuit arrangement, so that a V-shaped transfer characteristic is obtained. A second amplifier with negative amplification is connected to the output of the adding circuit for amplifying and inverting the output signal from the adding circuit.

Figure 1:
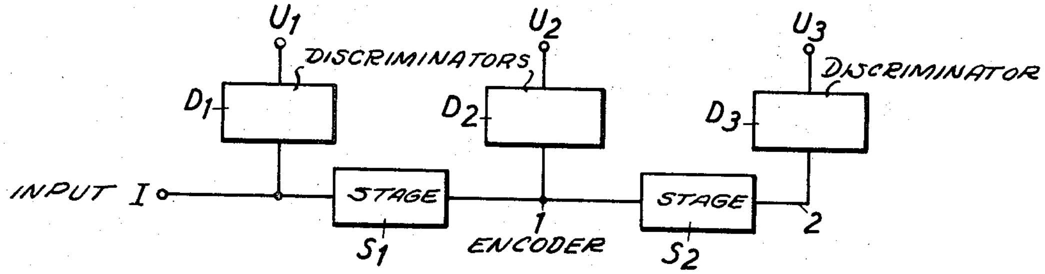
Figure 2:
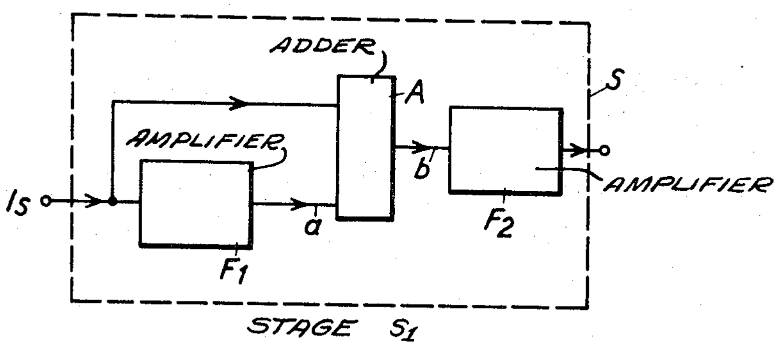
Figures 3A, 3B, 3C:
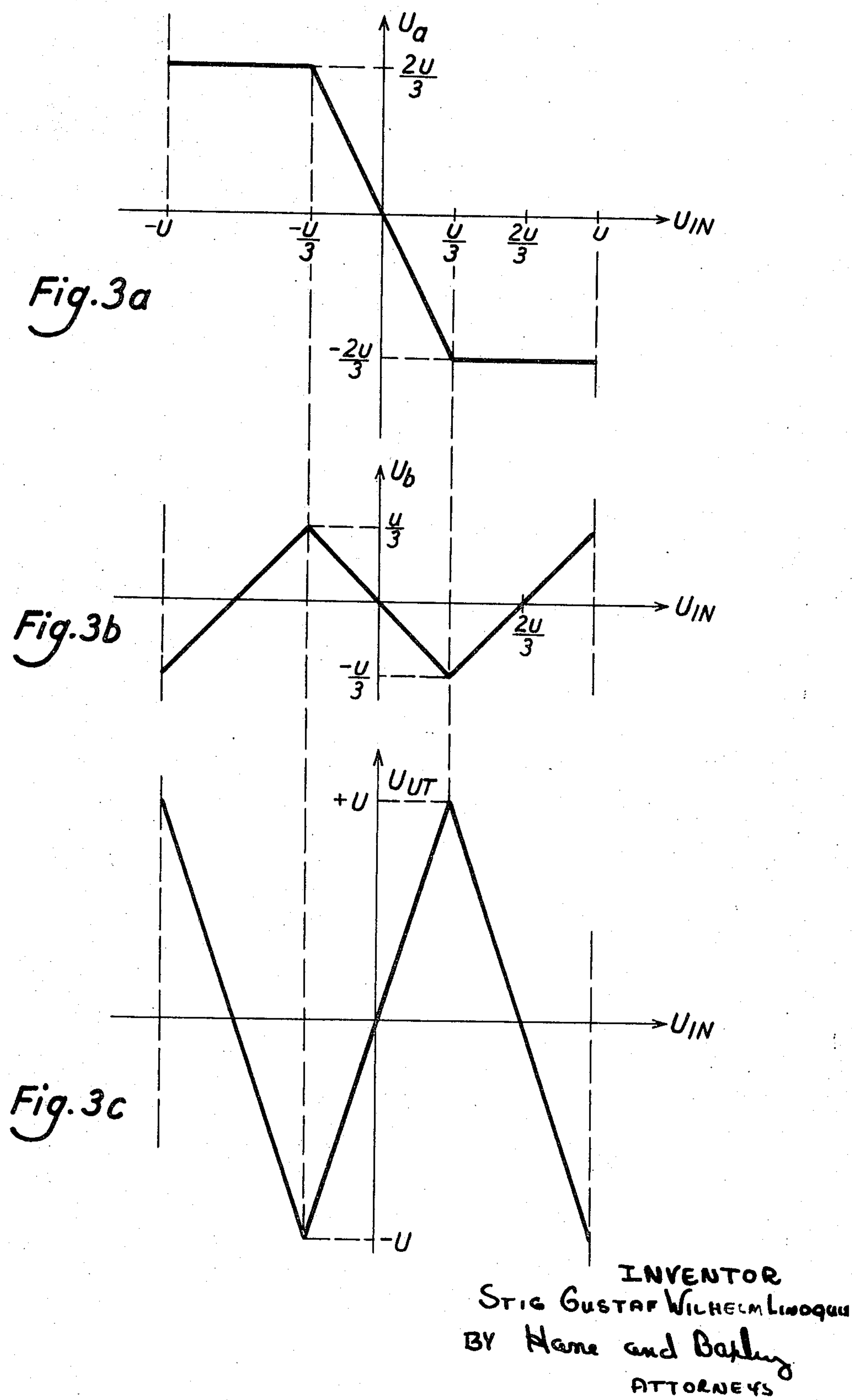
Figure 4:
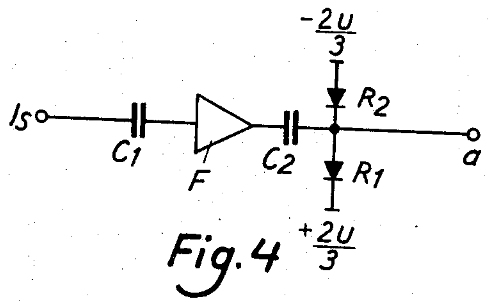
Figure 5:
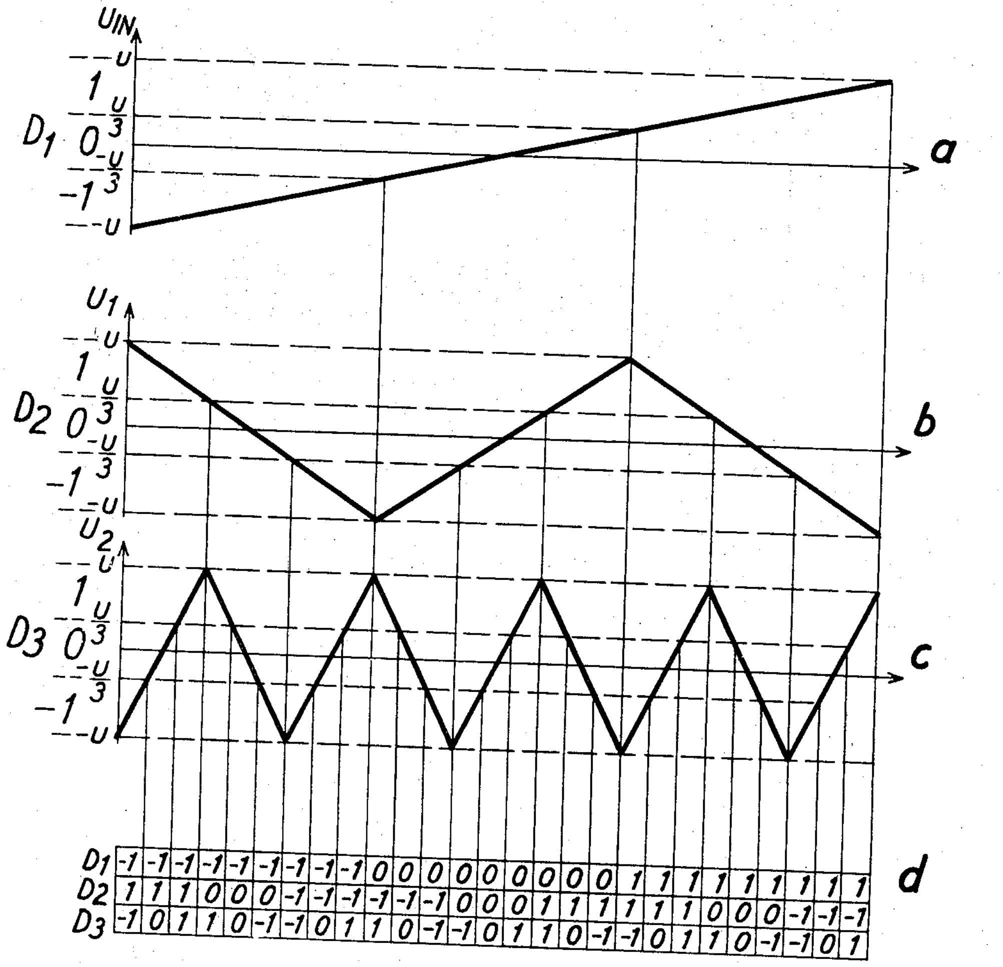
Figures 6, 7, 8:
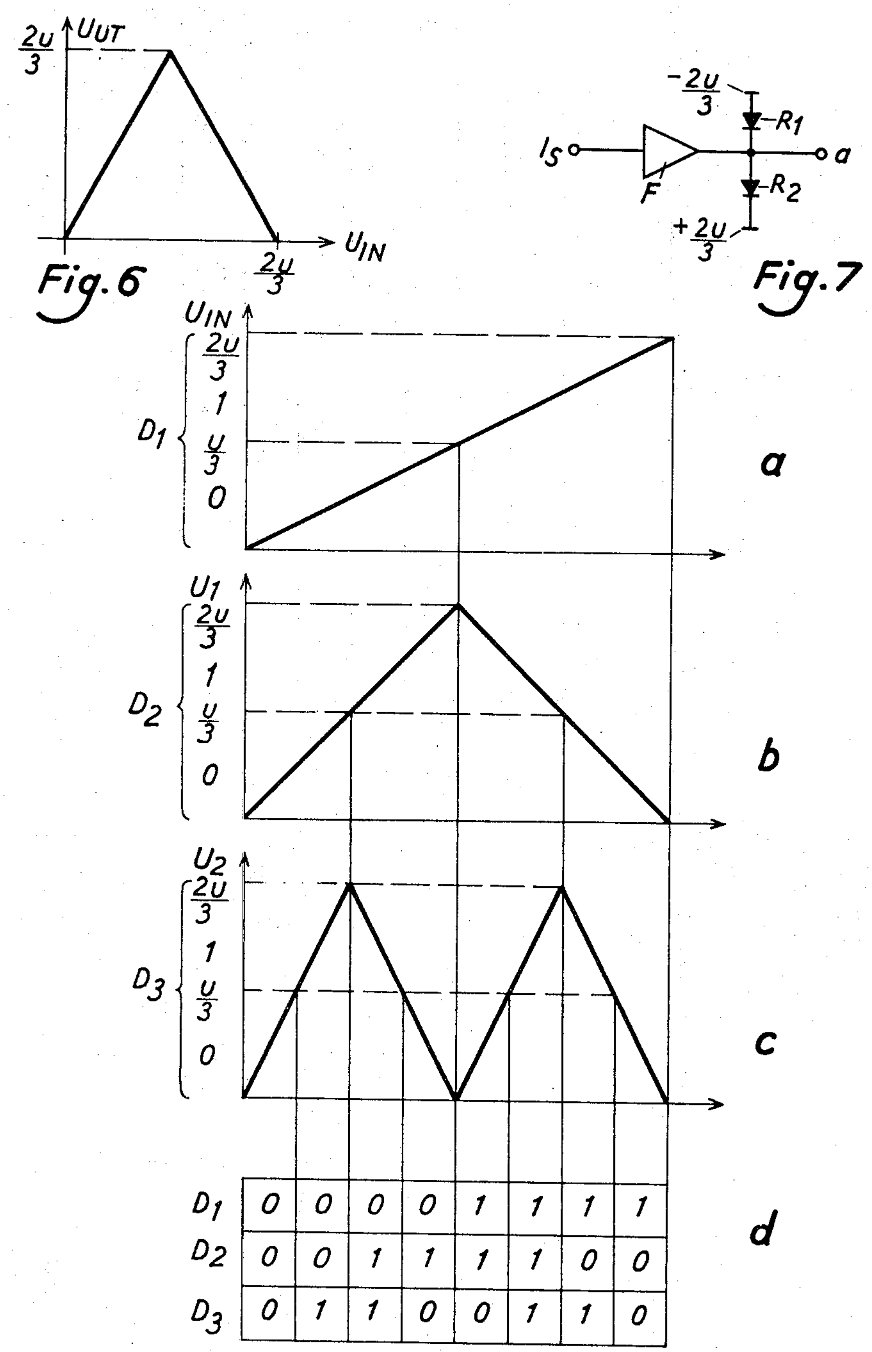

The invention will be explained in more detail, by means of two embodiments, with reference to the accompanying drawing in which FIG. 1 shows a block diagram of a stage-by-stage encoder, FIG. 2 a block diagram of a circuit arrangement according to the invention for use as a stage in an encoder according to FIG. 1, FIGS. 3*a–c* show a voltage diagram of the condition at three different points in the stage according to FIG. 2, FIG. 4 shows a circuit diagram of an amplifier included in the stage according to FIG. 2, FIGS. 5*a–c* are voltage diagrams showing the voltage at three different points in an encoder according to FIG. 1, FIG. 5*d* shows the digital values obtained from the three outputs of the encoder according to FIG. 1 in correspondence to the analog signals, FIG. 6 shows a voltage characteristic according to an embodiment of the circuit arrangement according to the invention, FIG. 7 shows a circuit diagram of an amplifier included in the arrangement according to FIG. 6, FIGS. 8*a–c* are voltage diagrams showing the voltage at three different points in an encoder according to FIG. 1 and FIG. 8*d* shows the digital values obtained from the three outputs of the encoder according to FIG. 1.

FIG. 1 shows an example of an encoder which, for the sake of simplicity, comprises only two stages. The reference character I designates the input of the encoder, to which the analog signals that are to be converted into digital form, are supplied. This input is connected to the two series-connected stages S1 and S2 and has a transfer characteristic which will be described below. To the outputs of the stages and to the input of the first stage discriminators D1, D2 and D3 are connected. Each discriminator delivers one out of a number of definite direct voltages dependent on the voltage being applied to the inputs of the discriminators. Each direct voltage is represented by a digital unit as will also be explained below.

FIG. 2 shows the typical stage S1 of FIG. 1. As a first example the analog voltage is assumed to be a ramp voltage which changes with constant slope between the values from $-U$ to $+U$, i.e., a waveform like that shown in FIG. 5*a* and it will also be assumed that it be digitally encoded in trinary form. To the input IS of the stage there is connected an amplifier F1 having, the transfer characteristic shown in FIG. 3*a*. $U_{in}$ and $U_a$ represent the input and the output respectively of the amplifier and U indicates the greatest amplitude of the analog voltage. From the transfer characteristic it can be seen that the amplifier has the amplification $-2$, when the input signal has a value between $U/3$ and $-U/3$, and gives a constant output signal absolute value of the input signal exceeds $U/3$. Such an amplifier is shown in FIG. 4 wherein the amplifier F, having an amplification of $-2$ has an input connected, via capacitor C1, to the input IS of the stage. The output of the amplifier F is connected, via a capacitor C2, to the output *a* of the circuit. Said output is also connected to a voltage source $2U/3$ through a rectifier R1 and to a voltage source $-2U/3$ through a rectifier R2. The rectifiers are connected in such a way that when the signal from the amplifier exceeds the value $2U/3$ the rectifier R1 conducts and prevents the voltage of the output to increase above said value. In a corresponding way the rectifier R2 conducts when the signal from the amplifier is below the value $-2U/3$ and prevents the voltage of the output to decrease below said value. The output of the amplifier F1 is according to FIG. 2 connected to the one input of an adding circuit A (an analog adder) which has a second input connected to the input $I_s$ of the stage and which has an output *b* from which a voltage $Ub$ is obtained according to FIG. 3*b*. This voltage is inverted and is amplified in the amplifier F2 connected to the output of the adding circuit, which amplifier has the amplification $-3$ and the output of which constitutes the output of the stage. The voltage $U_{ut}$ obtained at this output is shown in FIG. 3*c*.

In FIG. 5*a* are shown the different values between U and $-U$ that the input signal $U_{in}$ can have. FIGS. 5*b* and *c* show the voltages $U_1$ and $U_2$, respectively, in the points 1 and 2 respectively of FIG. 1 as functions of the analog signal $U_{in}$ supplied to the input I. The stages S1 and S2 are as shown by FIG. 2 with a circuit according to FIG. 4 being used as amplifier F1. If the discriminators D1, D2 and D3 are adjusted so that they give the output signal −1, if the input signal is less than $-U/3$, the output signal 0, if the input signal has a value between $-U/3$ and $U/3$, and the output signal +1, if the input signal exceeds $U/3$, the signals shown in FIG. 5*d* will be obtained on the outputs of the discriminators. The range U to −U of the analog signal will thus be divided into 27 equally large parts, each being represented by three trinary digits. The advantage of the stage according to the invention is that the amplifier F1 according to FIG. 4 requires no feedback and can use A.C. coupling which has the effect that it can be made very stable in a simple way.

FIG. 6 shows a transfer characteristic for a modification of the stage according to FIG. 2. It is hereby assumed that the analog signal varies only between 0 and $2U/3$ and that the amplification of the amplifier F2 has been changed to −2 and the circuit according to FIG. 4 has been replaced by the circuit according to FIG. 7. The circuit of FIG. 7 differs from the circuit according to FIG. 4 only in that the capacitors C1 and C2 have been short-circuited in order that the direct current component of the input and the output signals can be detected. If two such modified stages are connected in the arrangement according to FIG. 1 the voltages shown in FIGS. 8*a–c* will be obtained at the points 1 and 2, the designations being the same as in FIG. 5. If the discriminators D1, D2 and D3 give the output signal 0 or 1 in dependence on whether the input signal exceeds or does not exceed the value $U/3$, the input signals that are indicated in FIG. 8*d* will be obtained. As is shown the range $2U/3$ to 0 of the input signal $U_{in}$ will be divided into 8 parts, each of which being represented by three binary digits encoded according to the Gray code. In spite of the fact that the amplifier F1 in this case of course cannot be A.C. coupled an advantage is gained over previously used operational amplifiers because there are now no diodes in the feedback loops. Consequently, it is easier to stabilize the circuits. In addition, a faster response time is obtainable.

I claim:

1. An analog-to-digital encoder comprising: a plurality of serially connected encoding stages; each of said encoding stages having an input and an output, the input of the first encoding stage of the series being adapted to receive the analog signal to be digitally encoded, said analog signal being variable over a given range; a plurality of discriminators, each of said discriminators having an input and an output, each of said discriminators transmitting one of three digital values from its output in accordance with the amplitude of an analog signal received at its input, the input of a first of said discriminators being connected to the input of said first encoding stage, the input of each of the other of said discriminators being connected to the output of a different one of said encoding stages; each of said encoding stages comprising a first amplifier having an input connected to the input of the encoding stage and an output, said first amplifier transmitting a constant amplitude signal whenever receiving an analog signal having an amplitude within first and third portions of said given range and transmitting signals having an amplification of −2 whenever receiving an analog signal having an amplitude within the second portion, between said first and third portions of said given range, an analog signal adding circuit having first and second inputs and an output, said first and second inputs being connected, respectively, to the input and output of said first amplifier, and a second amplifier having an input and an output, said second amplifier having a uniform amplification of −3, the input of said second amplifier being connected to the output of said analog signal adding circuit and the output of said second amplifier being connected to the output of the encoding stage.

References Cited

UNITED STATES PATENTS

| | | | |
|---|---|---|---|
| 3,161,868 | 12/1964 | Waldhauer | 340—347 |
| 3,187,325 | 6/1965 | Waldhauer | 340—347 |
| 3,271,759 | 9/1966 | Hopper | 340—347 |
| 3,329,950 | 7/1967 | Shafer | 340—347 |
| 3,447,146 | 5/1969 | Saari | 340—347 |

MAYNARD R. WILBUR, Primary Examiner

G. R. EDWARDS, Assistant Examiner